May 7, 1935.  C. C. COOK ET AL  2,000,479
CLOSURE OPERATING MECHANISM
Filed May 11, 1934   2 Sheets-Sheet 1

C. C. Cook
M. M. Cook
Inventors

May 7, 1935.  C. C. COOK ET AL  2,000,479
CLOSURE OPERATING MECHANISM
Filed May 11, 1934   2 Sheets-Sheet 2
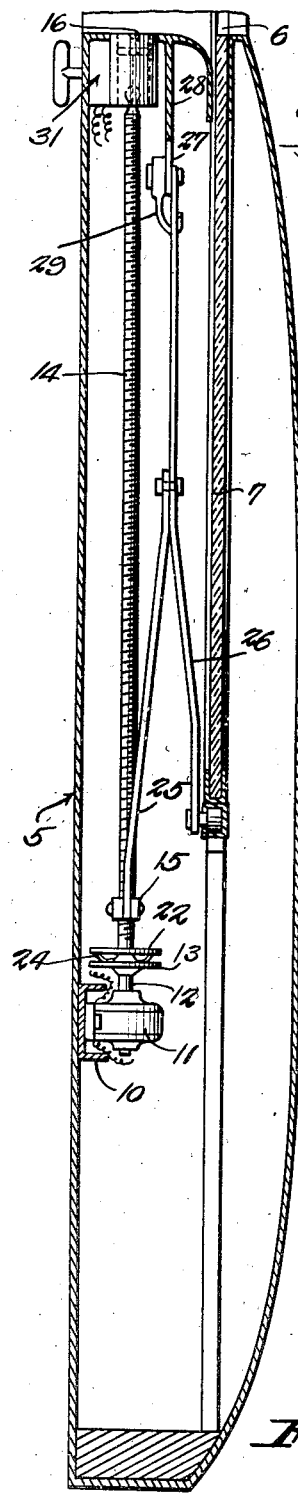
Fig. 2.
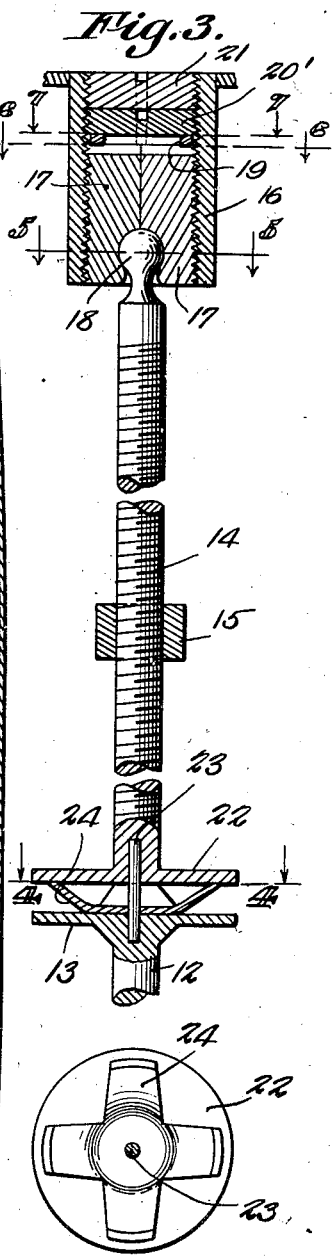
Fig. 3.
Fig. 4.
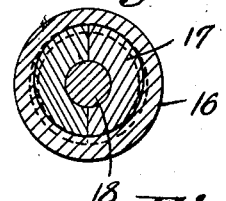
Fig. 5.
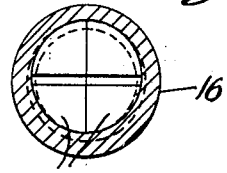
Fig. 6.
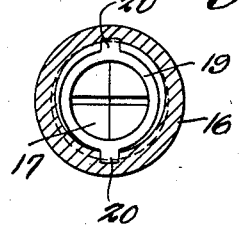
Fig. 7.
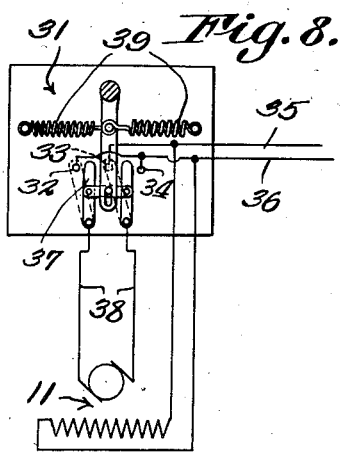
Fig. 8.
C. C. Cook
M. M. Cook
Inventors
By C. A. Snow & Co.
Attorneys.

Patented May 7, 1935

2,000,479

UNITED STATES PATENT OFFICE 2,000,479

CLOSURE OPERATING MECHANISM

Cleo C. Cook and Milford M. Cook, Visalia, Calif.

Application May 11, 1934, Serial No. 725,210

2 Claims. (Cl. 268—124)

This invention relates to closure operators and more particularly to motor vehicle window operators.

The primary object of the invention is to provide means whereby the windows of a motor vehicle may be raised or lowered by electric energy, it being necessary for the operator to merely move an electric switch, completing a circuit.

Another object of the invention is to provide a device of this character which may be readily and easily installed in a motor vehicle door structure, novel means being provided for adjusting the operating device to fit motor vehicle doors of various heights, insuring a true operation of the window operated by the device.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

Referring to the drawings,

Figure 2 is a vertical sectional view through the door and operating mechanism.

Figure 3 is an elevational view of the operating screw, the connecting head at the upper end of the screw being shown in section.

Figure 4 is a sectional view taken on line 4—4 of Figure 3.

Figure 5 is a sectional view taken on line 5—5 of Figure 3.

Figure 6 is a sectional view taken on line 6—6 of Figure 3.

Figure 7 is a sectional view taken on line 7—7 of Figure 3.

Figure 8 is a diagram illustrating the circuit and switch, forming a part of the invention.

Figure 1:
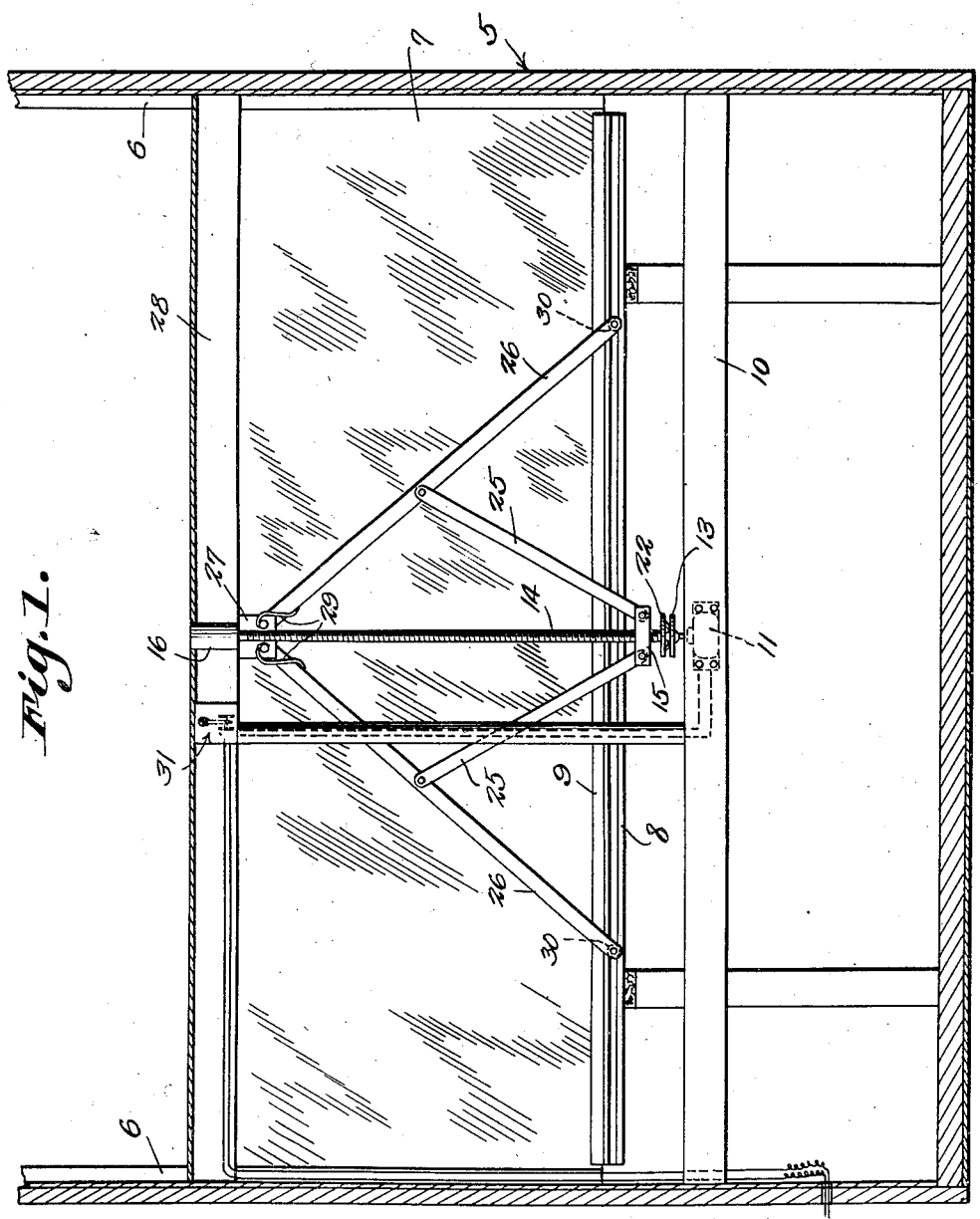
Figure 1 is a sectional view through a motor vehicle door, illustrating an electrically controlled operating means, constructed in accordance with the invention.

Referring to the drawings in detail, the reference character 5 designates a motor vehicle door provided with the usual window guides 6 in which the window 7 moves.

The reference character 8 designates a channel bar to which the lower bar 9 of the window support is secured.

Channel bar 10 which forms a part of the door structure, also provides a support for the electric motor 11 mounted in such a way that the motor shaft 12 thereof is disposed vertically, the upper end of the shaft 12, being formed with an enlargement 13.

Positioned directly above the upper end of the shaft 12, is the operating shaft indicated at 14, the shaft 14 being threaded throughout its length, the threads cooperating with threads formed on the collar 15.

Secured within the door structure, is a cylinder 16, which is formed with internal threads which cooperate with threads of the bearing 17, which bearing embodies separable sections, so that the bearing member may be readily and easily removed or replaced.

A socket is formed within the bearing member 17, for the reception of the head 18, whereby the operating shaft may rotate freely within the socket.

The bearing 17 is formed with a notch disposed in its upper end, for the reception of a screw-driver or similar positioning tool. Disposed directly above the bearing 17, is a lock washer 19 which is provided with extensions 20 that fit within the threads of the cylinder 16, holding the bearing 17 in its adjusted position.

Lock nuts 20 and 21 also fit within the upper end of the cylinder 16, to lock the assembly against rotary movement, when the shaft 14 is in operation.

At the lower end of the shaft 14, is an enlargement in the form of a disc 22, the enlargement 22 being connected with the enlargement 13, by means of the pin 23 fitted in openings in the ends of the shafts 12 and 14. A friction clutch member 24 is disposed between the enlargements 13 and 22 and acts to transmit movement of the shaft 12, to the shaft 14.

Pivotally connected with the collar 15, are arms 25, which arms have pivotal connection with the bars 26 at points intermediate the ends thereof, the upper ends of the bars 26 being pivotally connected to the depending flange 27 of the bar 28, which forms a part of the disc structure.

Spring members 29 are secured to the flange 27 and engage the bars 26, normally urging the lower ends of the bars outwardly and upwardly. As shown, the lower ends of the bars 26, are supplied with rollers 30 that fit within the open side of the channel bar 8, with the result that when the bars 26 swing outwardly and upwardly, the window 7, supported by the channel bar 8, will be elevated.

The control switch of the device is indicated by the reference character 31, which control switch embodies contact members 32, 33 and 34, which contact members are in circuit with a suitable source of electricity supply, through the wires 35 and 36. Movable switch blades 37 form a part of the control switch, and are in circuit with the motor 11, through the wires 38. Coiled springs indicated at 39 connect with the operating arm of the control switch, to normally hold the control switch in position. Thus it will be seen that due to this construction, when the control switch is moved to complete a circuit between contact members 32 and 33 and switch blades 37, the motor 11 is operated, which rotates the shaft 14.

Assuming that the window is in its open position, or the position shown by Figure 1 of the drawings, as the motor operates the shaft 14, the collar 15 will move upwardly over the shaft 14, causing the lower ends of the bars 26 to swing outwardly and upwardly, elevating the window.

When the window has reached the desired height, the switch is operated to break the circuit to the motor.

Should it be desired to lower the window, the switch is operated in the opposite direction, causing the shaft 14 to rotate in the opposite direction, feeding the collar 15 towards the lower end of the shaft 14.

Having thus described the invention, what is claimed is:

1. The combination with a vertically sliding window, of a window operator comprising a bar on which the window is mounted, a threaded shaft, a motor, a motor shaft extending from the motor, a friction clutch connecting the motor shaft and threaded shaft, a bearing in which the upper end of the threaded shaft is mounted, means for adjusting the bearing whereby the friction clutch is regulated, and means for transmitting movement of the threaded shaft to the bar, whereby the bar and window are moved vertically.

2. The combination with a vertically sliding window, of a window operator comprising a bar on which the window is mounted, a threaded shaft having a head at the upper end thereof, a vertically adjustable bearing having a socket in which the head is mounted, a motor having a motor shaft, formed with an enlarged end, a disk at the lower end of the threaded shaft, a clutch member between the disk and enlargement, means for adjusting the bearing vertically regulating the action of the clutch member, means for operating the threaded shaft, and means for transmitting movement of the threaded shaft to the bar and window supported thereby.

CLEO C. COOK.
MILFORD M. COOK.